(12) United States Patent
Zhang

(10) Patent No.: US 10,503,026 B2
(45) Date of Patent: Dec. 10, 2019

(54) LIQUID CRYSTAL DISPLAY PANEL AND METHOD FOR MANUFACTURING THE SAME AND LIQUID CRYSTAL DISPLAY APPARATUS

(71) Applicants: BOE Technology Group Co., Ltd., Beijing (CN); Hefei BOE Optoelectronics Technology Co., Ltd., Anhui (CN)

(72) Inventor: Jun Zhang, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 210 days.

(21) Appl. No.: 15/037,436

(22) PCT Filed: Aug. 31, 2015

(86) PCT No.: PCT/CN2015/088508
§ 371 (c)(1),
(2) Date: May 18, 2016

(87) PCT Pub. No.: WO2016/169180
PCT Pub. Date: Oct. 27, 2016

(65) Prior Publication Data
US 2017/0108728 A1    Apr. 20, 2017

(30) Foreign Application Priority Data

Apr. 24, 2015 (CN) .......................... 2015 1 0203495

(51) Int. Cl.
*G02F 1/1339*    (2006.01)
*G02F 1/1341*    (2006.01)

(52) U.S. Cl.
CPC .................... *G02F 1/13394* (2013.01); *G02F 2001/13396* (2013.01); *G02F 2001/13398* (2013.01); *G02F 2001/13415* (2013.01)

(58) Field of Classification Search
None
See application file for complete search history.

(56) References Cited

U.S. PATENT DOCUMENTS 5,398,127 A * 3/1995 Kubota ............. G02F 1/133753
349/126
6,097,467 A * 8/2000 Fujimaki ............. G02F 1/13394
349/141
(Continued)

FOREIGN PATENT DOCUMENTS

CN    203084385    7/2013
CN    103713426    4/2014
(Continued)

OTHER PUBLICATIONS

International Search Report and Written Opinion for International Application No. PCT/CN2015/088508, dated Jan. 29, 2016.
(Continued)

*Primary Examiner* — Edward J Glick
*Assistant Examiner* — David Y Chung
(74) *Attorney, Agent, or Firm* — Westman, Champlin & Koehler, P.A.

(57) ABSTRACT

The present disclosure provides a liquid crystal display panel having a long side defining a first direction and a short side defining a second direction, and the long side has a length greater than that of the short side. The liquid crystal display panel includes a first substrate, a second substrate and a plurality of spacers arranged between the first substrate and the second substrate, wherein liquid crystal droplets are able to flow among the plurality of spacers, and wherein the plurality of spacers are configured and arranged
(Continued)

such that a sum of cross sectional areas of the plurality of spacers per unit length in the first direction is greater than a sum of cross sectional areas of the plurality of spacers per unit length in the second direction. The liquid crystal display panel provided by the present disclosure may reduce the contamination at the periphery of a small size TFT-LCD device and facilitate flowing and diffusing of the liquid crystal droplets to corners of the device. As such, the present disclosure also provides a method for manufacturing the liquid crystal display panel and a liquid crystal display apparatus including the above liquid crystal display panel.

14 Claims, 2 Drawing Sheets

(56) References Cited

U.S. PATENT DOCUMENTS

| | | | | |
|---|---|---|---|---|
| 2007/0285609 | A1* | 12/2007 | Tanaka | G02F 1/1303 |
| | | | | 349/156 |
| 2009/0079928 | A1 | 3/2009 | Ohashi et al. | |
| 2010/0045922 | A1* | 2/2010 | Motomatsu | G02F 1/1339 |
| | | | | 349/156 |
| 2012/0008062 | A1* | 1/2012 | Jeong | G02F 1/133615 |
| | | | | 349/58 |
| 2012/0081641 | A1* | 4/2012 | Noh | G02F 1/13394 |
| | | | | 349/106 |
| 2012/0105789 | A1* | 5/2012 | Lin | G02F 1/13392 |
| | | | | 349/155 |
| 2014/0043549 | A1 | 2/2014 | Taniguchi et al. | |

FOREIGN PATENT DOCUMENTS

| | | |
|---|---|---|
| CN | 203858437 | 10/2014 |
| CN | 104765202 | 7/2015 |
| JP | 2004-126197 | 4/2004 |
| JP | 2007206713 A | 8/2007 |
| KR | 2002-0054869 | 7/2002 |

OTHER PUBLICATIONS

English translation of Box No. V from the Written Opinion of the International Searching Authority for International Application No. PCT/CN2015/088508, dated Jan. 29, 2016.
First Office Action for Chinese Patent Application No. 201510203495.2, dated May 4, 2017, 12 Pages.
Second Office Action for Chinese Patent Application No. 201510203495.2, dated Dec. 21, 2017, 10 pages.

* cited by examiner

LIQUID CRYSTAL DISPLAY PANEL AND METHOD FOR MANUFACTURING THE SAME AND LIQUID CRYSTAL DISPLAY APPARATUS

CROSS-REFERENCE TO RELATED APPLICATION

This application is a Section 371 National Stage Application of International Application No. PCT/CN2015/088508, filed on Aug. 31, 2015, entitled "Liquid Crystal Display Panel and Method for Manufacturing the Same and Liquid Crystal Display Apparatus", which has not yet been published, and which claims priority to Chinese Application No. 201510203495.2, filed on 24 Apr. 2015, incorporated herein by reference in their entirety.

BACKGROUND OF THE INVENTION

Field of the Invention

The present disclosure generally relates to the technical field of liquid crystal display, and in particular, to a liquid crystal display panel and a method for manufacturing the same and a liquid crystal display apparatus including the liquid crystal display panel.

Description of the Related Art

In the technical field of liquid crystal display, there is a large requirement for small size products such as cell phones and Pad. In a conventional small size TFT-LCD device, a liquid crystal layout pattern design arranged in a line is typically used. FIG. 1 shows a plan view of a conventional TFT liquid crystal display panel. The TFT liquid crystal display panel includes a CF substrate 1, a TFT substrate 2, a plurality of spacers 3 formed between the CF substrate 1 and the TFT substrate 2. In order to show an arrangement of the plurality of spacers 3, the CF substrate 1 and the TFT substrate 2 are shown schematically in transparent forms. Liquid crystal droplets 5 are filled between the CF substrate 1 and the TFT substrate 2 and able to flow among the plurality of spacer 3. In addition, the CF substrate 1 and the TFT substrate 2 are sealed by sealing glue at peripheries thereof. However, in such liquid crystal pattern layout, the liquid crystal droplets tend to contact with the sealing glue, and in particular may form contaminations in the direction in which the liquid crystal droplets flow over a shorter distance, for example, tending to cause adverse effects such as Mura, puncture, Zara, underfilling, Bubbles and the like, so as to cause the conventional small size TFT-LCD device to have adverse effects such as Mura. Further, in the conventional small size TFT-LCD device, due to the conventional liquid crystal layout pattern design, the liquid crystal droplets will not tend to flow to corners of the device.

SUMMARY

The present disclosure is intended to overcome or alleviate at least one or more technical problems in the prior art.

Also, at least one object of the present disclosure is to provide a liquid crystal display panel which may reduce contamination at the periphery of a small size TFT-LCD device.

A further object of the present disclosure is to provide a liquid crystal display panel which may facilitate diffusion of liquid crystal droplets to corners of the small size TFT-LCD device.

Another object of the present disclosure is to provide a method for manufacturing a liquid crystal display panel, which may reduce the contamination at the periphery of a small size TFT-LCD device.

A further object of the present disclosure is to provide a method for manufacturing a liquid crystal display panel, which may facilitate the diffusion of liquid crystal droplets to the corners of the small size TFT-LCD device.

Another object of the present disclosure is to provide a liquid crystal display apparatus, which may reduce the contamination at the periphery of a small size TFT-LCD device.

A further object of the present disclosure is to provide a liquid crystal display apparatus, which may facilitate the diffusion of liquid crystal droplets to the corners of the small size TFT-LCD device.

In accordance with an aspect, it provides a liquid crystal display panel having a long side defining a first direction and a short side defining a second direction, and comprising a first substrate, a second substrate and a plurality of spacers arranged between the first substrate and the second substrate, wherein liquid crystal droplets can flow among the plurality of spacers, and wherein the plurality of spacers are configured and arranged such that a sum of cross sectional areas of the plurality of spacers per unit length in the first direction is greater than a sum of cross sectional areas of the plurality of spacers per unit length in the second direction, so as to enable the liquid crystal droplets to have a flow rate in the first direction greater than that in the second direction.

In an embodiment, the plurality of spacers have an arrangement density in the first direction greater than that in the second direction.

In an embodiment, each of the plurality of spacers has a cross section in a shape of circle.

In an embodiment, a spacing between any two adjacent spacers in the first direction of the plurality of spacers is less than a spacing between any two adjacent spacers in the second direction of the plurality of spacers.

In an embodiment, each of the plurality of spacers has a cross section in a shape of elongated ellipse and the ellipse has a long axis at an angle of 0 to 45 degrees with respect to the first direction.

In an embodiment, the spacers are arranged in central symmetry with respect to a center of the display panel.

In an embodiment, each of the plurality of spacers has a cross section in a shape of elongated ellipse and the ellipse has a long axis extending in the first direction.

In an embodiment, at least one row of spacers in the first direction have cross sections in a shape of circle and other rows of spacers in the first direction have cross sections in a shape of elongated ellipse, and a long axis of the ellipse extends along the first direction.

In an embodiment, the at least one row of spacers in the first direction having cross sections in the shape of circle are arranged in a middle region of the display panel.

In an embodiment, the plurality of spacers have an arrangement density in corner regions, at which the long and short sides of the liquid crystal display panel intersect with each other, less than that in a central region of the liquid crystal display panel.

In an embodiment, the liquid crystal display panel is a TFT liquid crystal display panel.

The present application also provides a method for manufacturing a liquid crystal display panel, the liquid crystal display panel having a long side defining a first direction and a short side defining a second direction, wherein the long side has a length greater than that of the short side, wherein the method comprises:

providing a first substrate, a second substrate and a plurality of spacers arranged between the first substrate and the second substrate, wherein the plurality of spacers are configured and arranged such that a sum of cross sectional areas of the plurality of spacers per unit length in the first direction is greater than a sum of cross sectional areas of the plurality of spacers per unit length in the second direction; and providing liquid crystal droplets that flows among the plurality of spacers.

In an embodiment, the plurality of spacers have an arrangement density in the first direction greater than that in the second direction.

In an embodiment, a spacing between any two adjacent spacers in the first direction of the plurality of spacers is less than a spacing between any two adjacent spacers in the second direction of the plurality of spacers.

In an embodiment, each of the plurality of spacers has a cross section in a shape of circle.

In an embodiment, each of the plurality of spacers has a cross section in a shape of elongated ellipse and the ellipse has a long axis extending in the first direction.

In an embodiment, at least one row of spacers in the first direction have cross sections in a shape of circle and other rows of spacers in the first direction have cross sections in a shape of elongated ellipse, and a long axis of the ellipse extends along the first direction.

In an embodiment, the plurality of spacers have an arrangement density in corner regions, at which the long and short sides of the liquid crystal display panel intersect with each other, less than that in a central region of the liquid crystal display panel.

In accordance with another aspect, it provides a liquid crystal display apparatus comprising the liquid crystal display panel as described in any of the above embodiments.

The present disclosure at least achieves the following technical effects:

In the liquid crystal display panel, the method for manufacturing the liquid crystal display panel and/or the liquid crystal display apparatus provided by the present disclosure, by changing the design of shapes and layout patterns of the spacers in the small size TFT-LCD device, the flowing conditions of the liquid crystal droplets in a cell may be changed to reduce the contamination at the periphery of the small size TFT-LCD device and to enable the liquid crystal droplets to diffuse to the corners of the device.

Other objects and technical effects that the present disclosure can achieve will below be explained in the embodiments with reference to figures and description of specific examples.

BRIEF DESCRIPTION OF THE DRAWINGS

In order that the above and other objects, characteristics and advantages of the present disclosure may become more apparent, the present disclosure will be further explained below with reference to figures and embodiments.

DETAILED DESCRIPTION OF PREFERRED EMBODIMENTS OF THE INVENTION

Figure 1:
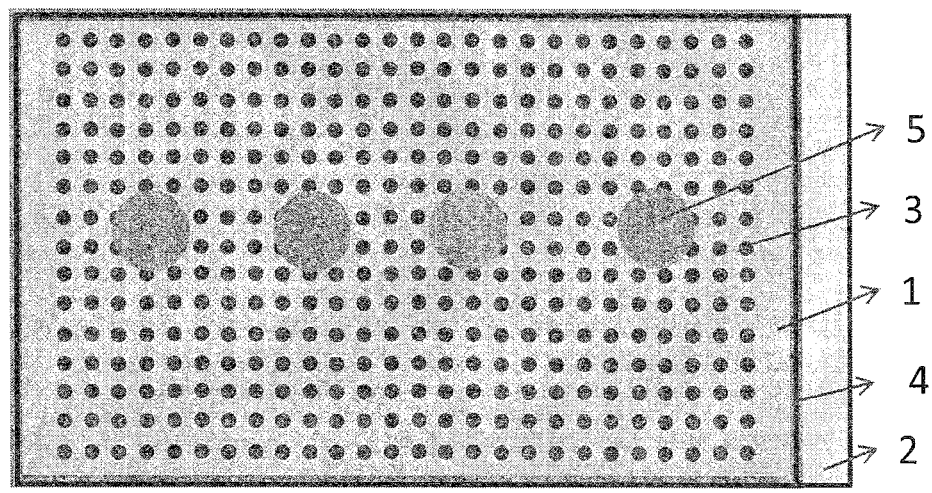
FIG. 1 is a schematic view showing a plan structure of a liquid crystal display panel in the prior art, in which a substrate is shown in a transparent form so as to show an arrangement of the spacers.

The embodiments of the present invention will be further explained below with reference to the figures and examples. Throughout the description, same reference numerals represent same or similar elements. The following embodiments along with the figures are only used to explain the present disclosure by way of examples, instead of being intended to limit the scope of the present disclosure.

In accordance with a general concept of the present disclosure, it provides a liquid crystal display panel having a long side defining a first direction and a short side defining a second direction, and comprising a first substrate, a second substrate and a plurality of spacers arranged between the first substrate and the second substrate, wherein liquid crystal droplets are able to flow among the plurality of spacers, and wherein the plurality of spacers are configured and arranged such that a sum of cross sectional areas of the plurality of spacers per unit length in the first direction is greater than a sum of cross sectional areas of the plurality of spacers per unit length in the second direction.

By configuring and arranging the plurality of spacers such that a sum of cross sectional areas of the plurality of spacers per unit length in the first direction is greater than a sum of cross sectional areas of the plurality of spacers per unit length in the second direction, a larger resistance to flowing of the liquid crystal droplets in the second direction is provided so as to slow the flowing of the liquid crystal droplets in the second direction and further facilitate flowing of the liquid crystal droplets in the first direction, thereby reducing the contamination at periphery of the small size TFT-LCD device.

The specific configuration and arrangement of the plurality of spacers for making a sum of cross sectional areas of the plurality of spacers per unit length in the first direction be greater than a sum of cross sectional areas of the plurality of spacers per unit length in the second direction will be explained below with reference to FIG. 2 and FIG. 3.

Figure 2:
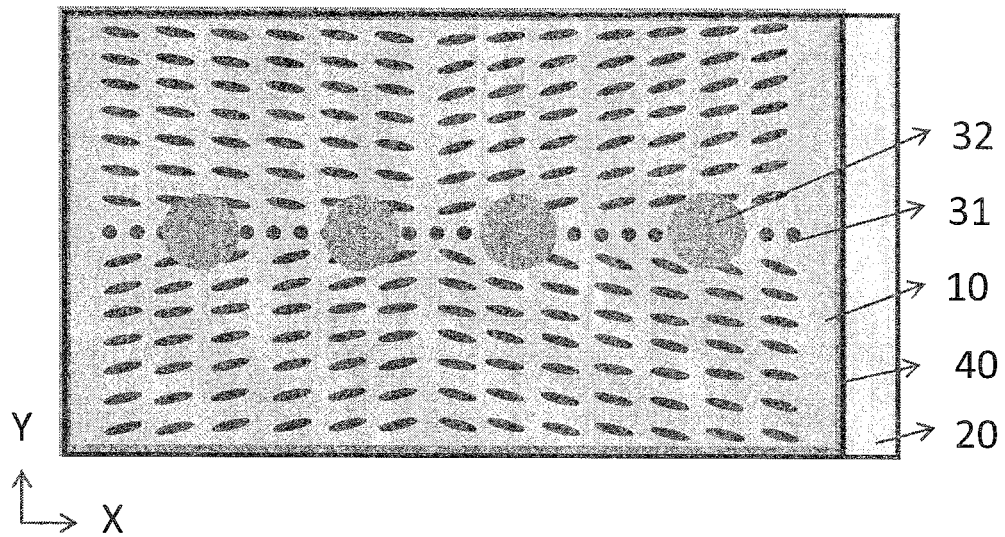
FIG. 2 is a schematic view showing a plan structure of a liquid crystal display panel in accordance with an embodiment of the present disclosure, in which a first substrate and a second substrate are shown in a transparent form so as to show an arrangement of the spacers.
Figure 3:
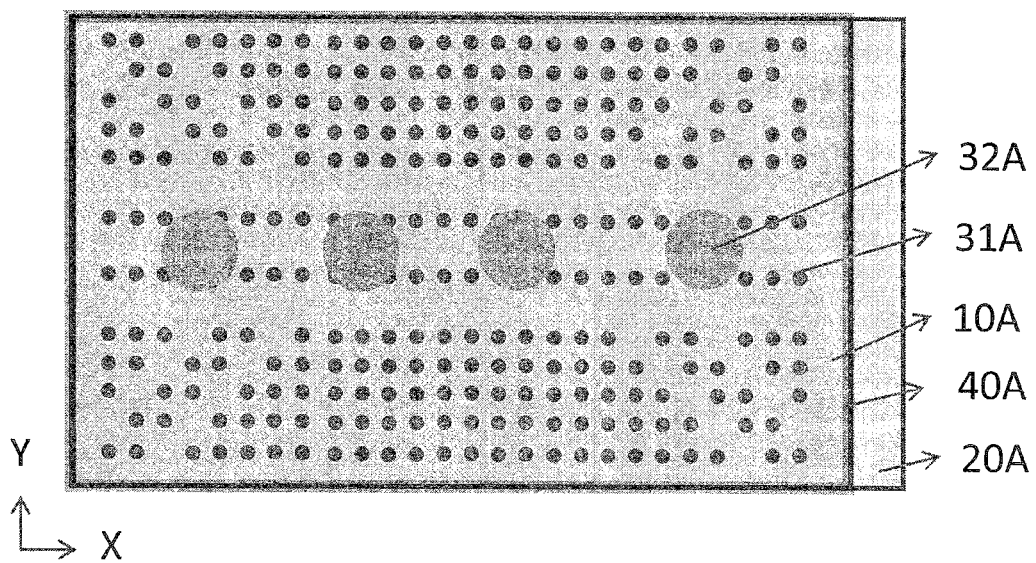
FIG. 3 is a schematic view showing a plan structure of a liquid crystal display panel in accordance with another embodiment of the present disclosure, in which a first substrate and a second substrate are shown in a transparent form so as to show an arrangement of the spacers.

Referring to FIG. 2 and FIG. 3, the present disclosure provides a liquid crystal display panel having a long side defining a first direction X and a short side defining a second direction Y. The long side has a length greater than that of the short side. As illustrated in FIG. 2, the liquid crystal display panel includes a first substrate 10, a second substrate 20 and a plurality of spacers 31 arranged between the first substrate 10 and the second substrate 20. Liquid crystal droplets 32 are filled into a space between the first substrate 10 and the second substrate 20 and are able to flow among the plurality of spacers 31. Further, the first substrate 10 and the second substrate 20 are sealed by a sealing glue 40 at periphery thereof. In the liquid crystal display panel provided by the present disclosure, the plurality of spacers 31 have a density in arrangement (i.e., arrangement density) in the first direction X greater than the density of the plurality of spacers 31 in arrangement in the second direction Y. For example, in an embodiment shown in FIG. 2, a spacing between any two adjacent spacers in the first direction X of the plurality of spacers 31 is less than a spacing between any two adjacent spacers 31 in the second direction Y. For example, in another embodiment shown in FIG. 3, an average spacing between two spacers 31A of the plurality of spacers 31A in the first direction X is less than an average spacing between two spacers 31A of the plurality of spacers 31A in the second direction Y.

For example, in an embodiment of the liquid crystal display panel shown in FIG. 2, at least one row of spacers 31 in the first direction X have cross sections in a shape of circle and other rows of spacers 31 in the first direction X have cross sections in a shape of elongated ellipse (or flat shape), and a long axis of the ellipse (or flat shape) extends along the first direction X. In this way, the plurality of spacers 31 may have an arrangement density in the first direction X greater than the arrangement density of the plurality of spacers 31 in the second direction Y. Alternatively, in another embodiment, each of the plurality of spacers 31 may have a cross section in a shape of circle. Or in another embodiment, each of the plurality of spacers 31 may have a cross section in a shape of elongated ellipse (or flat shape), and the long axis of the ellipse (or flat shape) extends along the first direction X. In above other embodiments, any arrangement of the spacers can be used as long as the arrangement density of the plurality of spacers 31 in the first direction X is greater than the arrangement density of the plurality of spacers 31 in the second direction Y.

According to the liquid crystal display panel provided by the present disclosure, with the arrangement that more spacers (i.e., having larger density) are arranged in the first direction in which the liquid crystal droplets may flow over a longer distance compared with in the second direction in which the liquid crystal droplets may flow over a shorter distance, a buffer effect for flowing of the liquid crystal droplets in the second direction may be achieved, (that is, when the liquid crystal droplets flow along the second direction, they are blocked by the plurality of spacers arranged densely along the first direction perpendicular to the second direction), so as to reduce impacts of the liquid crystal droplets to the sealing glue. Correspondingly, by arranging the spacers with smaller density in the second direction in which the liquid crystal droplets may flow over a shorter distance, the flowing of the liquid crystal droplets becomes relatively rapid in the first direction (that is, when the liquid crystal droplets flow along the first direction, the resistance from the spacers arranged along the second direction becomes relatively smaller), so as to reduce possibility of underfilling of the liquid crystal droplets. In this way, the above design may efficiently reduce the adverse effects, such as Mara, puncture, Zara, underfilling, Bubble and the like, which otherwise may be likely formed in the small size liquid crystal display panel.

FIG. 3 shows another embodiment of the liquid crystal display panel provided by the present disclosure. As shown in FIG. 3, this embodiment also defines the first direction X and the second direction Y. The length of a long side of the liquid crystal display panel which extends in the first direction X is greater than the length of a short side of the liquid crystal display panel which extends in the second direction Y. As illustrated in FIG. 3, the liquid crystal display panel includes a first substrate 10A, a second substrate 20A and a plurality of spacers 31A arranged between the first substrate 10A and the second substrate 20A. Liquid crystal droplets 32A are filled into a space between the first substrate 10A and the second substrate 20A and are able to flow among the plurality of spacers 31A. Further, the first substrate 10A and the second substrate 20A are sealed by a sealing glue 40A at periphery thereof. Similarly, in the present embodiment, the plurality of spacers 31A have a density in arrangement (i.e., an arrangement density) in the first direction X greater than the density of the plurality of spacers 31A in arrangement in the second direction Y (for example, as shown in an middle region in FIG. 3). Besides, in the embodiment of the liquid crystal display panel shown in FIG. 3, the plurality of spacers 31A have an arrangement density in corner regions, at which the long and short sides of the liquid crystal display panel intersect with each other, less than the arrangement density of the plurality of spacers 31A in a central region of the liquid crystal display panel. In this way, the liquid crystal display panel provided by the present embodiment does not only efficiently reduce the adverse effects, such as Mara, puncture, Zara, underfilling, Bubble and the like, which otherwise may be likely formed in the small size liquid crystal display panel, but also facilitate rapidly flowing and diffusing of the liquid crystal droplets to the corner regions so as to reduce possibility of underfilling of the liquid crystal droplets as the number of the spacers 31A at the corner regions is relatively small compared with other regions of the liquid crystal display panel.

Further, the liquid crystal display panel provided by the present disclosure may be a TFT liquid crystal display panel. The first substrate 10 or 10A may be a CF substrate and the second substrate 20 or 20A may be a TFT substrate.

As seen from the above description, in the liquid crystal display panel provided by the present disclosure, by changing the design of shapes and layout patterns of the spacers in the small size TFT-LCD device, the flowing conditions of the liquid crystal droplets in a cell may be changed to reduce the contamination at the periphery of the small size TFT-LCD device and facilitate flowing and diffusing of the liquid crystal droplets to the corners of the device.

As such, the present disclosure also provides a method for manufacturing the above liquid crystal display panel. The liquid crystal display panel has a long side defining a first direction X and a short side defining a second direction Y, and the long side has a length greater than that of the short side. In particular, the method includes: providing a first substrate 10 (10A), a second substrate 20 (20A) and a plurality of spacers 31 (31A) arranged between the first substrate 10 (10A) and the second substrate 20 (20A). The plurality of spacers are configured and arranged such that a sum of cross sectional areas of the plurality of spacers per unit length in the first direction is greater than a sum of cross sectional areas of the plurality of spacers per unit length in the second direction; and providing liquid crystal droplets 32 (32A) flowing among the plurality of spacers 31 (31A).

In an embodiment, the plurality of spacers 31 (31A) have an arrangement density in the first direction X greater than the density arrangement of the plurality of spacers 31 (31A) in the second direction Y.

According to the above manufacturing method provided by the present disclosure, in the manufactured liquid crystal display panel, a spacing between any two adjacent spacers in the first direction X of the plurality of spacers 31 (31A) is less than a spacing between any two adjacent spacers 31 (31A) in the second direction Y of the plurality of spacers 31 (31A).

In an embodiment of the above manufacturing method, each of the plurality of spacers may be produced to have a cross section in a shape of circle. In another embodiment of the above manufacturing method, each of the plurality of spacers may be produced to have a cross section in a shape of elongated ellipse and the ellipse has a long axis extending in the first direction X. In a further embodiment of the above manufacturing method, at least one row of spacers in the first direction X have cross sections in a shape of circle and other rows of spacers in the first direction X have cross sections in a shape of elongated ellipse, and the long axis of the ellipse extends along the first direction X.

In this way, the above method for manufacturing the liquid crystal display panel provided by the present disclosure may efficiently reduce the adverse effects, such as Mara, puncture, Zara, underfilling, Bubble and the like, which otherwise may be likely formed in the small size liquid crystal display panel.

Further, according to the above manufacturing method provided by the present disclosure, in the manufactured liquid crystal display panel, the plurality of spacers have a density in arrangement (i.e. an arrangement density) in corner regions, at which the long and short sides of the liquid crystal display panel intersect with each other, less than that in arrangement in a central region of the liquid crystal display panel. In this way, the manufactured liquid crystal display panel facilitates rapidly flowing and diffusing of the liquid crystal droplets to the corner regions so as to reduce possibility of underfilling of the liquid crystal droplets as the number of the spacers at the corner regions is relatively small.

The above manufacturing method provided by the present disclosure is preferably suitable to manufacturing of the TFT liquid crystal display panel. In the manufactured TFT liquid crystal display panel, the first substrate may be a CF substrate and the second substrate may be a TFT substrate.

As seen from the above description, in the method for manufacturing the liquid crystal display panel provided by the present disclosure, by changing the design of shapes and layout patterns of the spacers in the small size TFT-LCD device, the flowing conditions of the liquid crystal droplets in a cell are changed to reduce the contamination at the periphery of the small size TFT-LCD device and also to facilitates flowing and diffusing of the liquid crystal droplets to the corners of the device.

In addition, the present disclosure also provides a liquid crystal display apparatus including the liquid crystal display panel as described above.

The liquid crystal display apparatus provided by the present disclosure may be any products or components having display function, such as liquid crystal panels, electronic papers, organic light emitting diode panels, cell phones, tablet computers, televisions, display, notebook computers, digital camera frames or navigators.

As seen from the above description, in the liquid crystal display apparatus provided by the present disclosure, by changing the design of shapes and layout patterns of the spacers in the small size TFT-LCD device, the flowing conditions of the liquid crystal droplets in a cell are changed to reduce the contamination at the periphery of the small size TFT-LCD device and also facilitate flowing and diffusing of the liquid crystal droplets to the corners of the device.

Although several exemplary embodiments have been provided to explain the principles and effects of the present disclosure, it would be appreciated by those skilled in the art that the above embodiments are given by way of examples, instead of limiting the present invention. Various changes, modifications or equivalents made in these embodiments without departing from the principles and spirit of the disclosure will also fall within the scope of the present invention. The scope of the present disclosure should be delimited by appended claims in the present application.

What is claimed is:

1. A liquid crystal display panel having a long side defining a first direction and a short side defining a second direction, and the liquid crystal display panel comprising a first substrate, a second substrate and a plurality of spacers arranged between the first substrate and the second substrate, wherein liquid crystal droplets are able to flow among the plurality of spacers, and
   wherein the plurality of spacers are configured and arranged such that a sum of cross sectional areas of the plurality of spacers per unit length in the first direction is greater than a sum of cross sectional areas of the plurality of spacers per unit length in the second direction, so as to enable the liquid crystal droplets to have a flow rate in the first direction greater than that in the second direction,
   wherein the plurality of spacers are divided into a plurality of rows of spacers in the first direction, each spacer in at least one row has a cross section in a shape of circle, and the at least one row is arranged in a middle region of the liquid crystal display panel in the second direction, the plurality of rows except the at least one row are arranged on both sides of the middle region, on each side of the middle region, the plurality of rows except the at least one row are adjacent to each other, and each spacer in the plurality of rows except the at least one row has a cross section in a shape of elongated ellipse, and a long axis of the ellipse is tilted relative to the first direction, an angle between the long axis and the first direction is greater than 0 and less than or equal to 45 degrees.

2. The liquid crystal display panel according to claim 1, wherein the plurality of spacers have an arrangement density in the first direction greater than that in the second direction.

3. The liquid crystal display panel according to claim 2, wherein at least one of the plurality of spacers has a cross section in a shape of circle.

4. The liquid crystal display panel according to claim 3, wherein a spacing between any two adjacent spacers in the first direction of the plurality of spacers is less than a spacing between any two adjacent spacers in the second direction of the plurality of spacers.

5. The liquid crystal display panel according to claim 1, wherein the spacers are arranged in a central symmetry with respect to a center of the display panel.

6. The liquid crystal display panel according to claim 1, wherein the plurality of spacers have an arrangement density in corner regions, at which the long and short sides of the liquid crystal display panel intersect with each other, less than that in a central region of the liquid crystal display panel.

7. A liquid crystal display apparatus comprising the liquid crystal display panel according to claim 1.

8. The liquid crystal display apparatus according to claim 7, wherein the plurality of spacers have an arrangement density in the first direction greater than that in the second direction.

9. The liquid crystal display apparatus according to claim 8, wherein a spacing between any two adjacent spacers in the first direction of the plurality of spacers is less than a spacing between any two adjacent spacers in the second direction of the plurality of spacers.

10. A method for manufacturing a liquid crystal display panel, the liquid crystal display panel having a long side defining a first direction and a short side defining a second direction, wherein the long side has a length greater than that of the short side, wherein the method comprises:
    providing a first substrate, a second substrate and a plurality of spacers arranged between the first substrate and the second substrate, wherein the plurality of spacers are configured and arranged such that a sum of cross sectional areas of the plurality of spacers per unit length in the first direction is greater than a sum of cross sectional areas of the plurality of spacers per unit length in the second direction, the plurality of spacers are divided into a plurality of rows of spacers in the first direction, each spacer in at least one row has a cross section in a shape of circle, and the at least one row is arranged in a middle region of the liquid crystal display panel in the second direction, the plurality of rows except the at least one row are arranged on both sides of the middle region, on each side of the middle region, the plurality of rows except the at least one row are adjacent to each other, and each spacer in the plurality of rows except the at least one row has a cross section in a shape of elongated ellipse, a long axis of the ellipse is tilted relative to the first direction, an angle between the long axis and the first direction is greater than 0 and less than or equal to 45 degrees; and providing liquid crystal droplets flowing among the plurality of spacers.

11. The method according to claim 10, wherein the plurality of spacers have an arrangement density in the first direction greater than that in the second direction.

12. The method according to claim 11, wherein a spacing between any two adjacent spacers in the first direction of the plurality of spacers is less than a spacing between any two adjacent spacers in the second direction of the plurality of spacers.

13. The method according to claim 11, wherein at least one of the plurality of spacers has a cross section in a shape of circle.

14. The method according to claim 10, wherein the plurality of spacers have an arrangement density in corner regions, at which the long and short sides of the liquid crystal display panel intersect with each other, less than that in a central region of the liquid crystal display panel.

* * * * *